United States Patent [19]

Watanabe et al.

[11] Patent Number: 5,082,733
[45] Date of Patent: Jan. 21, 1992

[54] MAGNETIC RECORDING MEDIUM CONTAINING MAGNETIC PARTICLES SURFACE TREATED WITH A GLYCIDYL COMPOUND

[75] Inventors: Hideomi Watanabe; Mikio Ohno; Hiroshi Hashimoto; Tsutomu Okita, all of Kanagawa, Japan

[73] Assignee: Fuji Photo Film Co., Ltd., Kanagawa, Japan

[21] Appl. No.: 340,617

[22] Filed: Apr. 18, 1989

[30] Foreign Application Priority Data

Apr. 18, 1988 [JP] Japan .................. 63-93553

[51] Int. Cl.$^5$ .............................................. G11B 23/00
[52] U.S. Cl. .................................... 428/403; 428/407; 428/694; 428/900; 427/128
[58] Field of Search .............. 427/128; 428/403, 407, 428/694, 900

[56] References Cited

U.S. PATENT DOCUMENTS

| | | | |
|---|---|---|---|
| 4,407,901 | 10/1983 | Miyatsuka et al. | 428/694 |
| 4,471,009 | 9/1984 | Phillips | 427/386 |
| 4,594,174 | 6/1986 | Nakayama et al. | 252/62.54 |
| 4,810,572 | 3/1989 | Ooe et al. | 428/323 |

FOREIGN PATENT DOCUMENTS

| | | |
|---|---|---|
| 60-211627 | 10/1985 | Japan . |
| 61-090328 | 5/1986 | Japan . |
| 61-110334 | 5/1986 | Japan . |
| 62-075930 | 4/1987 | Japan . |

Primary Examiner—Merrell C. Cashion, Jr.
Assistant Examiner—Steven A. Resan
Attorney, Agent, or Firm—Sughrue, Mion, Zinn, Macpeak & Seas

[57] ABSTRACT

A method for preparing a magnetic recording medium is disclosed, comprising the steps of (1) surface-treating ferromagnetic particles with a glycidyl compound having a molecular weight of 1,000 or less and having an epoxy equivalent of 200 g/eq. or less, (2) dispersing the surface-treated ferromagnetic particles with a binder to prepare a magnetic coating composition, (3) coating the resulting magnetic coating composition on a nonmagnetic support, and then (4) drying the magnetic coating composition.

14 Claims, No Drawings

MAGNETIC RECORDING MEDIUM CONTAINING MAGNETIC PARTICLES SURFACE TREATED WITH A GLYCIDYL COMPOUND

FIELD OF THE INVENTION

The present invention relates to a method for preparing a magnetic recording medium comprising a nonmagnetic support and a magnetic layer.

BACKGROUND OF THE INVENTION

Magnetic recording media are widely used as audio tapes, video tapes, computer tapes or as floppy disks. A magnetic recording medium basically comprises a magnetic layer containing ferromagnetic particles dispersed in a binder and being laminated on a non-magnetic support.

Fundamentally, a magnetic recording medium is required to have high levels of various characteristics such as electromagnetic characteristics, running durability and running efficiency. Particularly, with the recent extensive development of 8 mm video tape recorders, it is necessary for a video tape to have particularly excellent electromagnetic characteristics such as a high video output and a high ability for reproducing original images.

There are various approaches to improvement of electromagnetic characteristics of a magnetic recording medium. One direct and effective approach is to improve the characteristics of the ferromagnetic particles, which serve as magnetic recording substances. Accordingly, ferromagnetic particles have been granulated finer and finer in order to achieve high density recording. Iron oxide modified with a different metal such as cobalt has been used instead of iron oxide as material for ferromagnetic particles. Recently, ferromagnetic metals such as iron, nickel or cobalt and alloys containing the above metals have been used.

It is possible to obtain a magnetic recording medium having excellent electromagnetic characteristics by using the thus-improved ferromagnetic particles. However, in practice, it is difficult to prepare such a magnetic recording medium. The reason for this difficulty is that sometimes the thus-improved ferromagnetic particles are improved in decrease of dispersibility of these ferromagnetic particles in the magnetic layer. Thus, the excellent characteristics of these ferromagnetic particles cannot be fully realized because as the ferromagnetic particles are made finer and finer, the dispersibility of the ferromagnetic particles in the binder tends to become poorer. The following difficult-to-disperse ferromagnetic particles are listed in descending order of dispersibility: γ-iron oxide, cobalt-coated γ-iron oxide, and ferromagnetic metal fine particles.

In another approach to the preparation of a magnetic coating composition, the steps of mixing, kneading and dispersing are conducted for a long period of time to improve the dispersibility of the above-described difficult-to-disperse ferromagnetic particles. However, this approach has two disadvantages. First, the characteristics of the fine ferromagnetic particles are sometimes deteriorated by the shearing force incident to mixing, kneading and dispersing the particles. Second, this manufacturing process is highly time consuming and, therefore, undesirable in light of production efficiency.

In this connection, methods for effectively dispersing the above-described difficult-to-disperse ferromagnetic particles without drastically changing the conventional process for preparing a magnetic recording medium have been investigated. Known examples of such methods include (i) a method for using ferromagnetic particles surface-treated with surface treating agents such as a silane coupling agent, (ii) a method for using dispersing agents such as a fatty acid to improve the dispersibility of ferromagnetic particles, and (iii) a method for using as a binder a mixture of the system comprising a vinyl copolymer, a urethane prepolymer, and low molecular weight epoxy resins (as disclosed in JP-B-56-23210) (the term "JP-B" as used herein refers to an "examined Japanese patent publication").

However, it has been found by the present inventors that the dispersibility of ferromagnetic particles cannot always sufficiently be improved even by the known methods.

For example, when ferromagnetic particles are surface-treated with the above-described silane coupling agents, the surface of the particles is made hydrophobic by the silane coupling agent, and thus the stability of dispersed ferromagnetic particles in the magnetic coating composition is improved. However, the compatibility of the coated ferromagnetic particles with the resins is disadvantageously decreased. This relative incompatibility sometimes prevents the dispersibility of ferromagnetic particles in the magnetic layer from being sufficiently improved at a final stage. Further, the silane coupling agent itself is very expensive, and, therefore, is difficult to use as a treating agent for treating ferromagnetic particles used in a conventional magnetic recording medium in light of the manufacturing costs.

A fatty acid which is generally employed as a lubricating agent in the magnetic layer of a magnetic recording medium has the ability to disperse ferromagnetic particles. The dispersibility of ferromagnetic particles can be improved by adjusting the added amount thereof. Generally, the amount of fatty acid sufficient for use as a dispersing agent should be more than the amount used when the fatty acid is employed as a lubricating agent in the magnetic layer.

On the other hand, it is known that when a fatty acid is used in an excess amount, it works as a plasticizing agent for the binder. Therefore, when the fatty acid is used as a dispersing agent for ferromagnetic particles, the fatty acid is inevitably used in excess and the binder is therefore inevitably plasticized. When the binder is plasticized, running properties deteriorate. Thus, even though the surface smoothness of a magnetic recording medium is improved by improving the dispersibility of the ferromagnetic particles contained in the medium's magnetic layer, the running properties are deteriorated. In other words, although dispersibility can be improved by using a large amount of fatty acid, durability and running properties can suffer.

As described above, a low molecular weight epoxy resin can be mixed with a vinyl copolymer and a urethane prepolymer to form a predetermined binder which can be mixed and kneaded with ferromagnetic particles and coated. In this case, not only is the binder especially predetermined, but also the improvement of the dispersibility of the ferromagnetic particles is insufficient, and as described above, the great length of time required for mixing and kneading deteriorates the characteristics of the ferromagnetic particles.

SUMMARY OF THE INVENTION

An object of the present invention is to provide a method for preparing a magnetic recording medium having particularly excellent electromagnetic characteristics and running properties.

More particularly, an object of the present invention is to provide a method for preparing a magnetic recording medium by improving dispersibility of the ferromagnetic particles in the magnetic layer so that the characteristics of the ferromagnetic particles may be fully realized, thereby improving electromagnetic characteristics while maintaining excellent running properties.

The above objects of the present invention can be attained by a method for preparing a magnetic recording medium, which comprises the steps of (1) surface-treating ferromagnetic particles with a glycidyl compound having a molecular weight of 1,000 or less and having an epoxy equivalent of 200 g/eq. or less, (2) dispersing the surface-treated ferromagnetic particles with a binder to prepare a magnetic coating composition, (3) coating the resulting magnetic coating composition on a nonmagnetic support, and then (4) drying the magnetic coating composition.

DETAILED DESCRIPTION OF THE INVENTION

Examples of the glycidyl compound having a molecular weight of 1,000 or less and having an epoxy equivalent of 200 g/eq. or less, which can be used in the present invention include a bisphenol A epoxy resin, a glycidylamine epoxy resin, a novolak epoxy resin, a bisphenol F resin, a glycidyl ester resin, a resorcinol diglycidyl ether resin, a resorcinol epoxy resin, an alicyclic epoxy resin such as

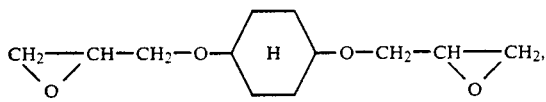

an aliphatic epoxy resin such as

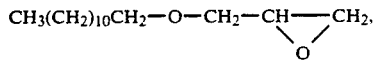

and a glycidyl-containing monomer such as glycidyl methacrylate or glycidyl phenyl ether, all of which are commercially available. Use of any of these glycidyl compounds, either alone or in combination, in accordance with the method of the present invention can fully disperse and bring about a high level of dispersion of the ferromagnetic particles.

When the above-described glycidyl compound is dissolved in an organic solvent, and ferromagnetic particles are added thereto, mixed, kneaded and dispersed, the glycidyl compound adsorbs or bonds to the surfaces of the ferromagnetic particles. Further, when a binder is added thereto, mixed and kneaded, the dispersibility of the ferromagnetic particles in the binder is remarkably improved on account of the aforementioned surface coating of the glycidyl compound.

Thus, the surface of ferromagnetic particles becomes coated with the above-described glycidyl compound. Therefore, when a magnetic layer is formed, the ferromagnetic particles have an improved affinity to resins, and as a result, the dispersibility of the ferromagnetic particles in the magnetic layer is improved.

The chemical structures of the aforementioned illustrative glycidyl compounds used in the present invention are set forth below.

A. The aforementioned bisphenol A epoxy resin (which is also called an epibis epoxy resin) is represented by formula (A):

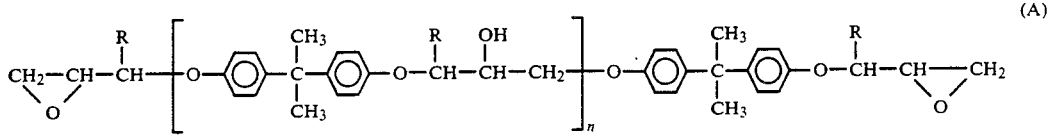

wherein R is H or $CH_3$; and n is an integer of 0 to 3.

B. The aforementioned glycidylamine epoxy resin is represented by formulae ($B_1$), $B_2$) or ($B_3$):

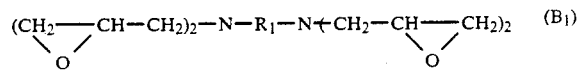

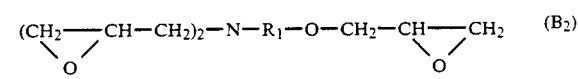

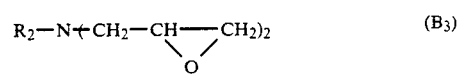

wherein $R_1$ is

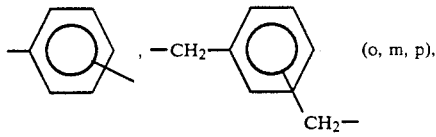

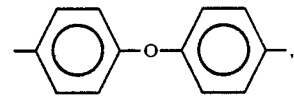

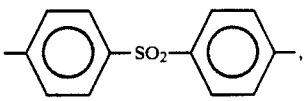

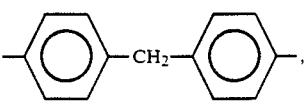

wherein (o, m, p) means bonding is possible at any of the ortho, meta, or para positions; $R_2$ is

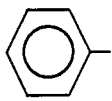

or a hydrocarbon having from 4 to 24 carbon atoms.

C. The aforementioned novolak epoxy resin is represented by formula (C):

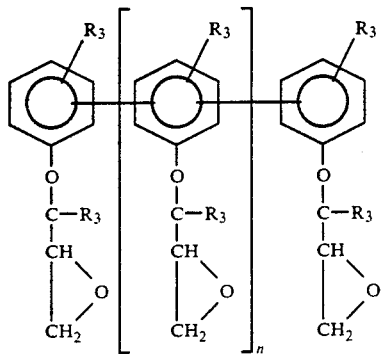

wherein $R_3$ is H or $CH_3$, and n is an integer of from 0 to 10.

D. The aforementioned bisphenol F epoxy resin is represented by formula (D):

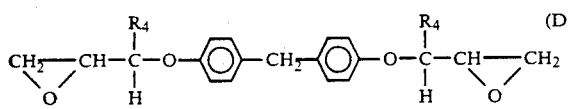

wherein $R_4$ is H or $CH_3$.

E. The aforementioned glycidyl ester resin is represented by formula (E):

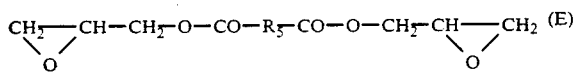

wherein $R_5$ is

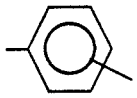

(which can be bonded at any of the ortho, meta, or para positions),

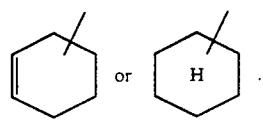

F. The aforementioned resorcinol diglycidyl ether is represented by formula (F):

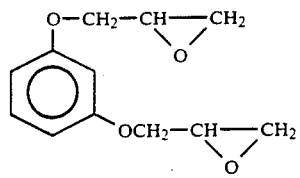

The above-described glycidyl compound which can be employed in the present invention have a molecular weight of 1,000 or less and preferably from 85 to 1,000. If the molecular weight is 1,000 or more, the effect of improving the dispersibility of the ferromagnetic particles is reduced, and the addition of such a compound would undesirably tend to deteriorate the durability of the magnetic layer. The epoxy equivalent of the glycidyl compound employed in the present invention is 200 g/eq. or less. When the epoxy equivalent is 200 g/eq. or more, the effect of improving the dispersibility of the ferromagnetic particles is undesirably reduced.

In the magnetic layer of the present invention, the above-described glycidyl compound is present in an amount of generally from 0.1 to 7 parts by weight based on 100 parts by weight of the ferromagnetic particles. Preferably, the glycidyl compound is present in an amount of from 0.15 to 6 parts by weight based on 100 parts by weight of the ferromagnetic particles so that the dispersibility of ferromagnetic particles is further improved to such a degree that the surface gloss of the magnetic layer becomes increased. More preferably, the glycidyl compound is present in an amount of from 0.2 to 5 parts by weight based on 100 parts by weight of the ferromagnetic particles, so that the electromagnetic characteristics are greatly improved. When the amount of the glycidyl compound used is less than 0.1 part by weight per 100 parts by weight of the ferromagnetic particles, the effect of adding the glycidyl compound is not always effectively realized, and when the amount used is more than 7 parts by weight per 100 parts by weight of the ferromagnetic particles, the dispersibility of the ferromagnetic particles is not always improved without any restriction, i.e., undesirable side effects can occur.

In one embodiment of the method of the present invention, the step of surface-treating the ferromagnetic particles comprises dispersing the above-described glycidyl compound in a organic solvent having a low boiling point, adding the ferromagnetic particles into the organic solvent, mixing the ferromagnetic particles with the organic solvent, and then removing the organic solvent. What remains are pretreated ferromagnetic particles which can then be dispersed in a coating solution which already contains the binder to prepare a magnetic coating composition, and then coating the magnetic coating composition on a nonmagnetic support to prepare a magnetic recording medium.

In another embodiment of the method of the present invention, the step of surface-treating the ferromagnetic particles comprises dissolving or dispersing the above-described glycidyl compound and the ferromagnetic particles in a portion of the solvent used for preparing a magnetic coating composition to form a first solution, adding the binder to the remainder of the solvent to form a second solution, and then adding the first and second solutions together and mixing, kneading and dispersing the resultant mixture to prepare the magnetic coating composition.

In a magnetic recording medium prepared in accordance with the method of the present invention, the ferromagnetic particles are sufficiently dispersed by the use of the above-described glycidyl compound to make the surface of the magnetic layer smooth, thereby increasing maximum magnetic flux density and squareness ratio of the magnetic layer. Accordingly, a magnetic recording medium prepared in accordance with the method of the present invention exhibits excellent electromagnetic characteristics.

A magnetic recording medium prepared in accordance with the method of the present invention fundamentally comprises a nonmagnetic support and a magnetic layer containing ferromagnetic particles dispersed in a binder and provided on the support.

The materials for forming a nonmagnetic support can be those conventionally used as materials for the nonmagnetic support of a magnetic recording medium.

Examples of such materials for the nonmagnetic support include polyethylene terephthalate, polypropylene, polycarbonate, polyethylene naphthalate, polyamide, polyamideimide, polyimide, and metal foils (such as an aluminum foil or a stainless foil).

The thickness of the nonmagnetic support is generally from 3 to 50 $\mu$m and preferably from 5 to 30 $\mu$m.

A backing layer may be provided on the surface of the nonmagnetic support which is opposite to the surface provided with the magnetic layer as described in U.S. Pat. Nos. 4,135,016 and 4,567,063.

In the magnetic recording medium of the present invention, a magnetic layer containing ferromagnetic particles dispersed in the binder is provided on the above-described nonmagnetic support.

Examples of ferromagnetic particles which can be used in the present invention include ferromagnetic particles of metal oxides such as $\gamma$-$Fe_2O_3$, $Fe_3O_4$, or bertholide compounds, ferromagnetic particles of different metal.iron oxides such as Co-containing $\gamma$-$Fe_2O_3$, and ferromagnetic metal fine particles mainly comprising ferromagnetic metals such as iron.

The shape of the ferromagnetic particles which can be used in the present invention is not particularly limited. Generally, acicular, granular, dice-like, rice grain-like and plate-like shapes can be used. The acicular particles are particularly preferred.

It is highly advantageous to use the method of the present invention when the ferromagnetic particles to be included in the magnetic recording medium are ferromagnetic metal fine particles which have poorer dispersibility than other ferromagnetic particles. When ferromagnetic metal fine particles are used, it is the most effective to use ferromagnetic metal fine particles containing iron, cobalt, or nickel and having a specific surface area of 42 $m^2/g$ or more, preferably 45 $m^2/g$ or more.

Such ferromagnetic metal fine particles have a metal content of 75 wt % or more, and 80 wt % or more of the metal content is at least one kind of ferromagnetic metal or an alloy (e.g., Fe, Co, Ni, Fe-Co, Fe-Ni, Co-Ni, Co-Ni-Fe), and less than 20 wt % of the metal content may contain the other elements (e.g., Al, Si, S, Sc, Ti, V, Cr, Mn, Cu, Zn, Y, Mo, Rh, Pd, Ag, W, Sn, Sb, B, Te, Ba, Ta, Re, P, Au, Hg, Bi, La, Ce, Pr, Nd, Pb and Zn). The above ferromagnetic metals may contain a slight amount of water, hydroxide or oxide. The method for preparing the above ferromagnetic metal fine particles is already known in U.S. Pat. Nos. 4,455,345 and 4,690,863, and prior to surface treatment, the ferromagnetic metal fine particles which can be used in the present invention can be prepared by a conventional method.

The amount of binder which can be used in the present invention is generally from 10 to 40 parts by weight and preferably from 15 to 30 parts by weight, based on 100 parts by weight of the ferromagnetic particles.

Examples of resins which can be used as binder include cellulose derivatives, vinyl chloride copolymers (e.g., a) copolymers of vinyl chloride and vinyl acetate which contain a third component such as maleic anhydride, b) copolymers of vinyl chloride and vinyl acetate, c) saponified compounds of a) and/or b), and d) vinyl chloride copolymers containing a polar group such as $-CO_2M$, $-SO_3M$ or $-PO_3M_2$ wherein M represents a hydrogen atom or an alkali metal atom), vinylidene chloride copolymers, polyester resins, acrylic resins, polyvinyl acetal resins, polyvinyl butyral resins, phenoxy resins, epoxy resins, butadiene and acrylonitrile copolymers, polyurethane resins and urethane epoxy resins. The foregoing resins can be used alone or in combination.

Of the foregoing resins, it is preferred to use polyurethane resins and vinyl chloride copolymers in combination. When polyurethane resins and vinyl chloride copolymers are used, it is particularly preferred that at least one of these two resins have a repeating unit having a polar group.

Examples of a polar group present as a repeating unit of a vinyl chloride copolymer include $-COOM$, $-SO_3M$, $-OSO_3M$ and $-PO(OM)_2$, wherein M is a hydrogen atom or an alkali metal atom. The vinyl chloride copolymer may contain repeating units having the same or different polar groups. It is preferred to use a vinyl chloride copolymer containing a repeating unit having $-SO_3Na$ as a polar group and/or a repeating unit having $-COOH$ as a polar group.

The polar group-containing repeating unit is generally present in the vinyl chloride copolymer in an amount of generally from 0.001 to 5.0 mol %, preferably from 0.01 to 3.0 mol %, and more preferably from 0.05 to 0.3 mol %, based on the total mols of the copolymer. When the amount of the repeating unit is less than 0.001 mol %, the dispersibility of the ferromagnetic particles sometimes decreases, and when the amount of the repeating unit is more than 5.0 mol %, the copolymer becomes moisture absorbent, and the weather resistance of a magnetic tape tends to decrease.

It is further preferable for the above-described vinyl chloride copolymer to have a repeating unit having an epoxy group. The epoxy group in the vinyl chloride copolymer chiefly functions to stabilize the vinyl chloride copolymer and to prevent the copolymer from undergoing a dehydrochloric acid reaction which otherwise proceeds with passage of time.

When the epoxy group-containing repeating unit is present in the vinyl chloride copolymer, the unit is preferably present in an amount of from 1 to 30 mol % based on the total mols of the copolymer. The ratio of the epoxy group-containing repeating unit is preferably from 0.01 to 0.5 mol, and more preferably from 0.01 to 0.3 mol per mol of the vinyl chloride repeating unit of the vinyl chloride copolymer.

The number average molecular weight of the above-described vinyl chloride copolymer is generally from 10,000 to 100,000 and preferably from 15,000 to 60,000.

The binder used in the present invention is preferably a hardened binder where one or more polyisocyanate compounds are added to the above-described vinyl chloride copolymer and polyurethane resins.

Specific examples of such polyisocyanate compounds include a reaction product of 3 mols of diisocyanate such as diphenylmethane-4,4'-diisocyanate, tolylene diisocyanate or xylylene diisocyanate and 1 mol of trimethylolpropane, a buiret adduct product of 3 mols of hexamethylene diisocyanate, an isocyanurate adduct product of 5 mols of tolylene diisocyanate, an isocyanurate adduct product of 3 mols of tolylene diisocyanate and 2 mols of hexamethylene diisocyanate, and a polymer of diphenylmethane diisocyanate.

The additive amount of the polyisocyanate compound is generally the same or less than that of the above-described polyurethane resins.

By using a polyurethane resin, a vinyl chloride copolymer and a polyisocyanate compound, the polyisocyanate compound forms a three-dimensional cross-linking between the polyurethane resin and the vinyl chloride copolymer and thereby makes the binder tough.

It is further preferred that the magnetic layer of the magnetic recording medium prepared in accordance with the present invention contains a fatty acid. In the magnetic layer, a fatty acid works as a lubricating agent, and when preparing a magnetic coating composition, the fatty acid works to improve the dispersibility of the ferromagnetic particles.

When a fatty acid is used in the magnetic layer, it is present in an amount of from 0.1 to 5 parts by weight and preferably from 0.3 to 4 parts by weight based on 100 parts by weight of the ferromagnetic particles.

Examples of the fatty acid which can be used in the present invention include capric acid, lauric acid, undecyl acid, myristic acid, palmitic acid, stearic acid, behenic acid, montanic acid, oleic acid, elaidic acid, linolic acid, linolenic acid, and stearol acid.

When a fatty acid is used, the lubricating effect is further improved when the fatty acid is used in combination with a fatty acid ester as a lubricating agent.

When a fatty acid ester is used, the fatty acid ester is generally present in an amount of from 0.1 to 5 parts and preferably from 0.3 to 4 parts, by weight based on 100 parts by weight of the ferromagnetic particles.

When a fatty acid and a fatty acid ester are used in combination, the weight ratio of the fatty acid to the fatty acid ester is generally from 1/9 to 9/1 and preferably from 1/5 to 5/1.

Examples of the fatty acid ester which can be used in the present invention include octyl myristate, butyl myristate, methyl myristate, butyl stearate, ethyl palmitate, butoxyethyl palmitate, oleyl oleate, tridecyl stearate and butoxyethyl stearate.

It is preferable to further include inorganic particles having a Mohs' hardness of 5 or more in the magnetic layer of the magnetic recording medium prepared in accordance with the present invention.

The inorganic particles which can be used herein are not particularly limited, provided that these particles have a Mohs' hardness of 5 or more. Examples of such inorganic particles include $Al_2O_3$ (Mohs' hardness of 9), TiO (Mohs' hardness of 6), $TiO_2$ (Mohs' hardness of 6.5), $SiO_2$ (Mohs' hardness of 7), $SnO_2$ (Mohs' hardness of 6.5), $Cr_2O_3$ (Mohs' hardness of 9) and $\alpha$-$Fe_2O_3$ (Mohs' hardness of 5.5). These inorganic particles can be used alone or in combination.

It is particularly preferable to use inorganic particles having a Mohs' hardness of 8 or more. When inorganic particles having a Mohs' hardness of less than 5 are used, the inorganic particles tend to come off from the magnetic layer and hardly have an abrasive function on a tape head, whereby head clogging readily takes place and running durability deteriorates.

The aforesaid inorganic particles are generally present in an amount of from 0.1 to 20 parts by weight and preferably from 1 to 10 parts by weight, based on 100 parts by weight of the ferromagnetic particles.

In addition to inorganic particles, it is desirable to include carbon black, particularly carbon black having an average particle diameter of generally from 10 to 300 nm and preferably from 10 to 200 nm (nanometer; $10^{-9}$ m) in the magnetic layer.

According to the method of the present invention, the surface-treated ferromagnetic particles, binders, and if desired, the above-described additives are dispersed in an organic solvent conventionally used such as toluene, butyl acetate, ethyl acetate, methyl ethyl ketone, cyclohexanone or tetrahydrofuran to prepare a magnetic coating composition. Then, the magnetic coating composition is coated on a nonmagnetic support so that the dry thickness of the magnetic layer is generally from 0.1 to 10 $\mu$m and preferably from 0.3 to 7 $\mu$m. The magnetic layer is then provided with magnetic orientation, then is dried, and thereafter is provided with a surface smoothing treatment and a hardening treatment, and then is slit.

Generally, a magnetic layer may be prepared by coating the magnetic coating composition directly or through an adhesive layer or an under layer onto a non-magnetic support.

Methods for preparing and coating a magnetic coating composition, methods for magnetic orientation, drying and surface smoothing treatment and hardening treatment are conventionally known in JP-A-60-125920 (the term "JP-A" as used herein refers to a "published unexamined Japanese patent application"), and the present invention can be prepared in accordance with the above methods.

EXAMPLES

The present invention will be illustrated in more detail by the following Examples and Comparative Examples; but the present invention is not to be construed as being limited thereto. In the Examples and Comparative Examples, all parts are by weight.

EXAMPLE 1

Formulation for a Magnetic Coating Composition

| Composition X | |
|---|---|
| Ferromagnetic Metal Fine Particles (formulation: Fe 94%, Zn 4%, Ni 2%, Hc: 1,500 Oe, specific surface area: 54 $m^2$/g) | 100 parts |
| Epoxy Resins ("Epikote resins, grade: 828", manufactured by Shell Chemical Company Limited) (glycidyl compound; molecular weight: 355, epoxy equivalent: 184–194 g/eq.) | 1.0 part |
| Toluene | 125 parts |

In an initial dispersing step, the above Composition X was sufficiently mixed, kneaded and dispersed. Then, in a subsequent dispersing step, the following Composition Y was added to the dispersed Composition X, and the resulting Composition of X plus Y was dispersed again.

| Composition Y | |
|---|---|
| Butyl Stearate | 2 parts |
| Methyl Ethyl Ketone | 125 parts |
| Vinyl Chloride Copolymer | 12 parts |
| (vinyl chloride: 77 wt %, | |
| —SO$_3$Na: 0.8 wt %, epoxy group: | |
| 3.9 wt %, hydroxyl group: 0.5 wt %) | |
| Polyurethane Resin | 8 parts |
| (polyester polyurethane; | |
| molecular weight: 40,000, | |
| —SO$_3$Na: two groups per one | |
| molecule | |
| α-Al$_2$O$_3$ | 5 parts |
| Stearic Acid | 2 parts |

The resulting Composition of X plus Y was mixed, kneaded and dispersed in a ball mill for 48 hours, and then 8 parts of polyisocyanate compound ("Desmodule L" manufactured by Bayer Co., Ltd.) was added thereto, mixed, kneaded and dispersed, and thereafter was filtrated by a filter having an average pore diameter of 1 μm (micrometer: $10^{-6}$ m) to obtain a magnetic coating composition. The thus-obtained magnetic coating composition was coated on a surface of a polyethylene terephthalate support having a thickness of 10 μm by a reverse roll so that the dry thickness of the magnetic layer was 4.0 μm.

The thus-coated nonmagnetic support was subjected to magnetic orientation by magnets having a flux density of 3,000 gauss before the magnetic layer was dried. Then, the magnetic layer was dried and subjected to supercalendering treatment. The resulting product was slit to an 8 mm width to prepare an 8 mm video tape.

EXAMPLE 2

The same procedure as in Example 1 was repeated to prepare an 8 mm video tape except that 1.0 part of glycidyl methacrylate (molecular weight: 142, epoxy equivalent: 142 g/eq.) was used instead of Epikote resins (grade: 828) in Example 1.

EXAMPLE 3

The same procedure as in Example 1 was repeated to prepare an 8 mm video tape except that 1.0 part of a glycidylamine epoxy resin YH434 (molecular weight: 426, epoxy equivalent: between 110 and 130 g/eq., produced by Toto Kasei Co., Ltd.) was used instead of Epikote resins (grade: 828) in Example 1.

EXAMPLE 4

The same procedure as in Example 1 was repeated to prepare an 8 mm video tape except that 1.0 part of a novolak epoxy resin YDPN-638 (molecular weight: 850, epoxy equivalent: between 170 and 190 g/eq., produced by Toto Kasei Co., Ltd.) was used instead of Epikote resins (grade: 828) in example 1.

EXAMPLE 5

1 Part by weight of Epikote resins (grade: 828) was added and dissolved in 99 parts by weight of methyl ethyl ketone.
100 Parts by weight of ferromagnetic metal fine particles used in Example 1 was added to 100 parts by weight of the above solution, mixed and then methyl ethyl ketone was removed therefrom to obtain ferromagnetic metal fine particles treated with Epikote resins (grade: 828). As a result of analysis, it was found that the Epikote resin was present on the ferromagnetic metal particles in an amount of 0.95 wt % based on the weight of the ferromagnetic metal particles.

Then, the same procedure as in Example 1 was repeated to prepare an 8 mm video tape, except that in preparing Composition X ferromagnetic metal fine particles treated with Epikote resins (grade: 828) as above were used instead of the untreated ferromagnetic metal fine particles and epoxy resin was not added upon mixing, kneading and dispersing.

EXAMPLE 6

The same procedure as in Example 1 was repeated to prepare an 8 mm video tape except that the step of mixing ferromagnetic metal fine particles with only Epikote resins (grade: 828) and a solvent in Example 1 (i.e., the initial dispersing step) was omitted. Instead, all of the components of Compositions X and Y were simultaneously added and simultaneously dispersed.

COMPARATIVE EXAMPLE 1

The same procedure as in Example 1 was repeated to prepare an 8 mm video tape except that Epikote resins (grade: 828) was not used and the initial dispersing step was omitted.

COMPARATIVE EXAMPLE 2

The same procedure as in Example 1 was repeated to prepare an 8 mm video tape except that 1.0 part of epoxy resin Epikote 1009 (molecular weight: 3,750, epoxy equivalent: between 2,400 and 3,300 g/eq.) was used instead of Epikote resins (grade: 828) in Example 1.

COMPARATIVE EXAMPLE 3

The same procedure as in Example 1 was repeated to prepare an 8 mm video tape except that 1.0 part of phenoxy resin (PKHH) (molecular weight: 14,000) was used instead of Epikote resins (grade: 828) in Example 1.

Categories of Analysis

Surface Glossiness

Surface glossiness of a magnetic layer was measured using a standard glossiness meter (prepared by Suga Testing Machine Co., Ltd.) at an angle of incidence of 45° and a reflective angle of 45°. The values shown in Table 1 are relative values when the surface glossiness of a magnetic layer of the magnetic recording medium obtained in Comparative Example 1 is assigned a value of 100%.

Maximum Residual Magnetic Flux Density (Bm) and Squareness Ratio (SQ)

The magnetic characteristics at coercive force (Hm) of 5 kOe were measured using a vibrating sample magnetometer (VSM) (produced by Toei Kogyo Co., Ltd.).

C/N Ratio (carrier/noise ratio)

Using a commercially available 8 mm video tape recorder (Fujix-8 manufactured by Fuji Photo Film Co., Ltd.), signals at 5 MHz were recorded and noise occurring within the range of 5±1 MHz (i.e., from about 4 to 6 MHz) was measured while those signals were reproduced. Thus, the ratio of reproduced signals to noise was measured. The output level measuring device "NV-870HD" produced by Matsushita Electric Industrial Co., Ltd. was used. The values shown in Table 1 are relative values when the C/N ratio of the magnetic recording medium obtained in Comparative Example 1 is assigned a value of 0 dB.

The results of the above-described analyses are shown in Table 1.

TABLE 1

| Example No. | Surface Gloss | Bm (gauss) | SQ | C/N Ratio (dB) |
|---|---|---|---|---|
| Example 1 | 118 | 3,160 | 0.85 | +2.1 |
| Example 2 | 125 | 3,370 | 0.87 | +3.0 |
| Example 3 | 128 | 3,300 | 0.86 | +3.2 |
| Example 4 | 126 | 3,360 | 0.88 | +3.1 |
| Example 5 | 127 | 3,300 | 0.88 | +3.3 |
| Example 6 | 114 | 3,150 | 0.83 | +1.5 |
| Comparative Example 1 | 100 | 2,900 | 0.81 | 0 |
| Comparative Example 2 | 104 | 3,100 | 0.82 | +0.7 |
| Comparative Example 3 | 98 | 2,950 | 0.80 | 0 |

As is apparent from the results of Table 1, a magnetic recording medium having improved dispersibility of the ferromagnetic particles in its magnetic layer and thus improved electromagnetic characteristics and also having excellent running properties could be obtained by using ferromagnetic particles surface treated with glycidyl compounds having a molecular weight of 1,000 or less and having an epoxy equivalent of 200 g/eq. or less.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic recording layer which contains ferromagnetic particles dispersed in a binder, wherein the ferromagnetic particles have been surface-treated with a glycidyl compound having a molecular weight of 1,000 or less and having an epoxy equivalent of 200 g/eq. or less, wherein surface-treatment of the magnetic particles has been carried out by a process which comprises dispersing the glycidyl compound and the ferromagnetic particles in a portion of a solvent used for preparing a magnetic coating composition to form a first solution, and wherein a binder is added to the remainder of the solvent to form a second solution, and then the first and second solutions are added together, and the resultant mixture is then mixed, kneaded and dispersed to prepare a magnetic coating composition, and thereafter the resulting magnetic coating composition is coated on the nonmagnetic support, and then the magnetic coating composition is dried to form the magnetic recording layer.

2. A method for preparing a magnetic recording medium comprising the steps of (1) surface-treating ferromagnetic particles with a glycidyl compound having a molecular weight of 1,000 or less and having an epoxy equivalent of 200 g/eq. or less, wherein the step of surface-treating the magnetic particles comprises dispersing the glycidyl compound and the ferromagnetic particles in a portion of a solvent used for preparing a magnetic coating composition to form a first solution, (2) a binder is added to the remainder of the solvent to form a second solution, and then the first and second solutions are added together, and the resultant mixture is then mixed, kneaded and dispersed to prepare the magnetic coating composition, (3) coating the resulting magnetic coating composition on a nonmagnetic support, and then (4) drying the magnetic coating composition.

3. The method for preparing a magnetic recording medium as in claim 2, wherein the step of surface-treating the ferromagnetic particles comprises dissolving the glycidyl compound in an organic solvent having a low boiling point, adding the ferromagnetic particles into the organic solvent, mixing the ferromagnetic particles with the organic solvent, and then removing the organic solvent.

4. The method for preparing a magnetic recording medium as in claim 2, wherein the glycidyl compound is at least one compound selected from the group consisting of a bisphenol A epoxy resin, a glycidylamine epoxy resin, a novolak epoxy resin, a bisphenol F resin, a glycidyl ester resin, an alicyclic epoxy resin, an aliphatic epoxy resin, glycidyl methacrylate, glycidyl phenyl ether, a resorcinol diglycidyl ether resin, and a resorcinol epoxy resin.

5. The method for preparing a magnetic recording medium as in claim 4, wherein the bisphenol A epoxy resin is represented by formula (A):

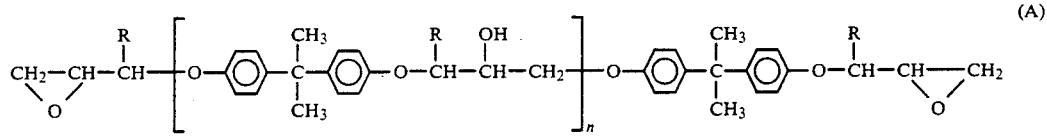

wherein R is H or CH$_3$; and n is an integer of 0 to 3.

6. The method for preparing a magnetic recording medium as in claim 4, wherein the glycidylamine epoxy resin is represented by formulae (B$_1$), (B$_2$), or (B$_3$):

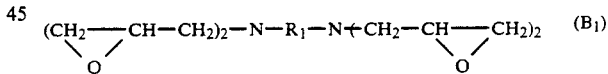

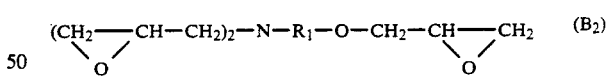

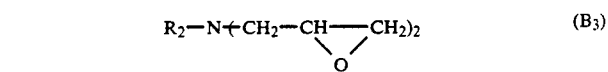

wherein R$_1$ is

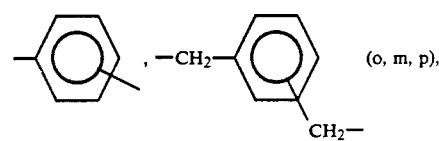

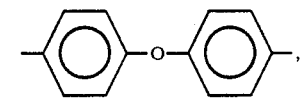

-continued

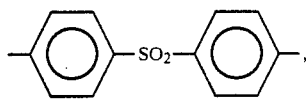

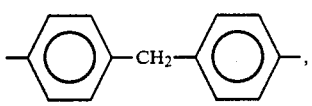

wherein (o, m, p) means bonding is possible at any of the ortho, meta, or para positions; $R_2$ is

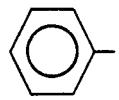

or a hydrocarbon having from 4 to 24 carbon atoms.

7. The method for preparing a magnetic recording medium as in claim 4, wherein the magnetic epoxy resin is represented by formula (C):

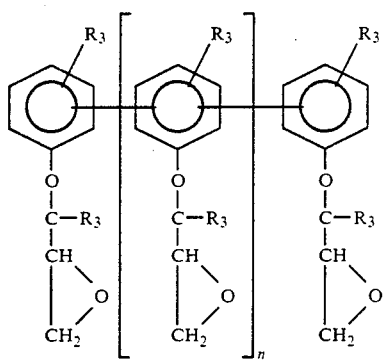
(C)

wherein $R_3$ is H or $CH_3$, and n is an integer of from 0 to 10.

8. The method for preparing a magnetic recording medium as in claim 4, wherein the bisphenol F epoxy resin is represented by formula (D):

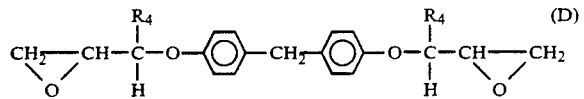
(D)

wherein $R_4$ is H or $CH_3$.

9. The method for preparing a magnetic recording medium as in claim 4, wherein the glycidyl ester resin is represented by formula (E):

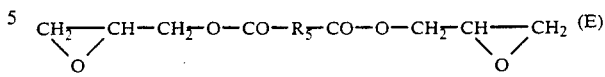
(E)

wherein $R_5$ is

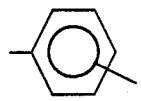

(which can be bonded at any of the ortho, meta, or para positions),

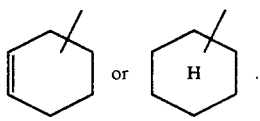

10. The method for preparing a magnetic recording medium as in claim 4, wherein the glycidyl ether (resorcinol diglycidyl resin) is represented by formula (F):

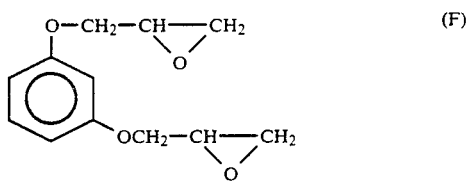
(F)

11. The method for preparing a magnetic recording medium as in claim 2, wherein the glycidyl compound is present in an amount of from 0.1 to 7 parts by weight based on 100 parts by weight of the ferromagnetic particles.

12. The method for preparing a magnetic recording medium as in claim 11, wherein the glycidyl compound is present in an amount of from 0.15 to 6 parts by weight based on 100 parts by weight of the ferromagnetic particles.

13. The method for preparing a magnetic recording medium as in claim 2, wherein the binder is present in an amount of from 10 to 40 parts by weight based on 100 parts by weight of the ferromagnetic particles.

14. The method for preparing a magnetic recording medium as in claim 2, wherein the binder is a polyurethane resin and a vinyl chloride copolymer.

* * * * *